(12) United States Patent
Gow et al.

(10) Patent No.: US 9,614,373 B2
(45) Date of Patent: Apr. 4, 2017

(54) MODULAR IMPLEMENTATION OF CORRELATIVE CONSUMPTION MANAGEMENT SYSTEMS

(75) Inventors: Philippe Hart Gow, Santa Monica, CA (US); Luke Asher Wilhelm, San Clemente, CA (US); Kevin James McIntyre, Huntington Beach, CA (US); Ronald D. Prosser, Huntington Beach, CA (US)

(73) Assignee: Green Charge Networks LLC, Santa Clara, CA (US)

( * ) Notice: Subject to any disclaimer, the term of this patent is extended or adjusted under 35 U.S.C. 154(b) by 549 days.

(21) Appl. No.: 13/429,617

(22) Filed: Mar. 26, 2012

(65) Prior Publication Data

US 2012/0245751 A1   Sep. 27, 2012

Related U.S. Application Data

(60) Provisional application No. 61/467,908, filed on Mar. 25, 2011, provisional application No. 61/467,929, filed on Mar. 25, 2011.

(51) Int. Cl.
*H02J 3/14* (2006.01)
*H02J 3/28* (2006.01)

(52) U.S. Cl.
CPC ...... *H02J 3/14* (2013.01); *H02J 3/28* (2013.01); *Y02B 70/3225* (2013.01); *Y04S 20/222* (2013.01); *Y04S 20/224* (2013.01); *Y10T 307/469* (2015.04)

(58) Field of Classification Search
CPC ....... G05F 5/00; H02J 3/14; H02J 3/16; H02J 3/18; H02J 3/28; H02J 2003/143
USPC .............. 700/28, 32, 33, 286, 287, 291, 295
See application file for complete search history.

(56) References Cited

U.S. PATENT DOCUMENTS

| | | | |
|---|---|---|---|
| 6,522,031 B2 | 2/2003 | Provanzana | |
| 6,728,646 B2 | 4/2004 | Howell | |
| 6,785,592 B1 | 8/2004 | Smith | |
| 7,142,949 B2 | 11/2006 | Brewster | |
| 7,894,946 B2 | 2/2011 | Kulyk | |
| 7,949,615 B2 | 5/2011 | Ehlers | |
| 2007/0061050 A1* | 3/2007 | Hoffknecht | .......... 700/291 |

(Continued)

OTHER PUBLICATIONS

Definition of "Provide", Merriam Webster Dictionary, http://www.merriam-webster.com/dictionary/provide.*

*Primary Examiner* — Nathan L Laughlin
(74) *Attorney, Agent, or Firm* — Richard C. Galati; Holland & Hart LLP

(57) ABSTRACT

Modular consumption management systems provide benefits of adaptability, customization, and progressive investment to electrical utility customers, particularly those with loads and electrical systems capable of curtailment and mitigation. Providing modules based on measurements made and consumption patterns detected in load profiles of individual loads and the site as a whole is described. Control and mitigation capabilities and methods are described in conjunction with identifying correlative modules that will best serve the needs of the site being monitored by a measurement module. Combined measurement and control modules or control and mitigation modules are also described, as well as interchangeable modules that can be put in place when excess consumption patterns at the site change over time.

19 Claims, 5 Drawing Sheets

(56) References Cited

U.S. PATENT DOCUMENTS

| | | | |
|---|---|---|---|
| 2010/0217450 A1* | 8/2010 | Beal | H02J 3/14 700/291 |
| 2010/0283606 A1 | 11/2010 | Tyspin | |
| 2010/0286937 A1 | 11/2010 | Hedley | |
| 2010/0327800 A1 | 12/2010 | Reineccius | |
| 2011/0004358 A1 | 1/2011 | Pollack | |
| 2011/0046806 A1 | 2/2011 | Nagel | |
| 2011/0184574 A1* | 7/2011 | Le Roux | G01D 4/004 700/291 |
| 2011/0231320 A1* | 9/2011 | Irving | 705/80 |
| 2011/0298285 A1* | 12/2011 | Lim et al. | 307/41 |
| 2012/0029711 A1* | 2/2012 | Besore | G01D 4/004 700/287 |
| 2012/0197452 A1* | 8/2012 | Matthews et al. | 700/292 |
| 2013/0116840 A1* | 5/2013 | Mauk | H02J 1/00 700/287 |
| 2013/0345891 A1* | 12/2013 | Beyerle et al. | 700/291 |

\* cited by examiner

MODULAR IMPLEMENTATION OF CORRELATIVE CONSUMPTION MANAGEMENT SYSTEMS

CROSS-REFERENCE TO RELATED APPLICATIONS

Priority is claimed for some aspects disclosed herein from related U.S. Provisional Patent Application Ser. Nos. 61/467,908 and 61/467,929, each filed Mar. 25, 2011, which are hereby each incorporated by reference in their entirety.

BACKGROUND

The present invention is directed to the field of energy consumption management analysis, consumption management systems, electrical distribution grid demand charge management, and related fields.

Rising prices for electricity and increased incentives for consumers who operate efficiently have been influential in developing and broadening the market for electricity consumption management systems. These systems influence the consumer's load by strategically providing additional energy to (or decreasing the energy consumed by) loads at a site through means such as photovoltaic energy sources, "smart" thermostats, uninterruptible power supplies, load shedding controllers, load displacement battery systems, and other features and systems well known in the art.

While many technologies have been developed for optimizing the usage of control devices and systems, they are difficult to implement in conjunction with each other due to their disparate sources, interfaces, and situations in which they are effective. Furthermore, difficulty in predicting the load management needs of the consumer leads to the provision and installation of management services and devices that will have an unpredictable impact on the consumption of the site. Thus, the devices put in place are frequently not ideally suited to the needs of the site's individualized load profile. This leads to inefficient expense of capital and other difficult up-front decisions about how to best approach energy consumption management for a particular site.

BRIEF SUMMARY

Embodiments of the invention include straightforward energy management solutions that allow inexpensive triage of sites and provide information concerning optimum management strategies before the investment in management systems is made. They may also provide modular interoperability between energy consumption management components and the loads they manage.

Embodiments of the invention are directed to methods and systems for modular implementation of a utility consumption management system for a site. A modular design allows for incremental investment from least to most expensive, allows the energy management triage of a site inexpensively, and provides decision making capability for expansion and development of an energy consumption management system that can adapt to changing management requirements.

In one embodiment, a method for modular implementation of a utility consumption management system for a site is provided wherein a measurement module is provided at the site. The measurement module is capable of gathering electricity consumption data and may have a data reporting means capable of reporting the consumption information. The measurement module is used to gather consumption data over time from the site about the loads and to report the data gathered. The data is examined for excess consumption patterns, and if one is detected, a control module having components that are correlated to the excess consumption pattern detected is provided. The control module is enabled to receive data from the measurement module and to control the consumption of the loads in response to the data received.

In some embodiments, a system for modular implementation of a utility management system is described, containing a measurement module, control module, and energy storage module to provide optimized consumption control and management in response to actual needs detected in information gathered by the measurement module.

In some embodiments, a module is first provided having measurement and control capability, and information gathered from the use of this module is analyzed to match the consumption of the site to a correlative energy storage module that is added to the measurement and control module.

Additional and alternative features, advantages, and embodiments of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments.

DETAILED DESCRIPTION

Typical embodiments of the invention are directed to methods and systems for implementing a utility consumption management system for a site. Preferred embodiments of the system may be implemented with modular components which allow the user to invest in electricity consumption management incrementally and allow the user to determine whether to invest in such equipment at all. Modular components of such a system progressively expand the capabilities of the management system based on the information and data gathered and based on the capabilities of previously installed components so that the modules provided at the site correlate to the needs of the site. In another aspect of the invention, existing consumption management capabilities may be expanded by adding modules or existing capabilities may be used more effectively by changing existing modules. These and other features and advantages of embodiments of the invention will now be described in detail.

Figure 1:
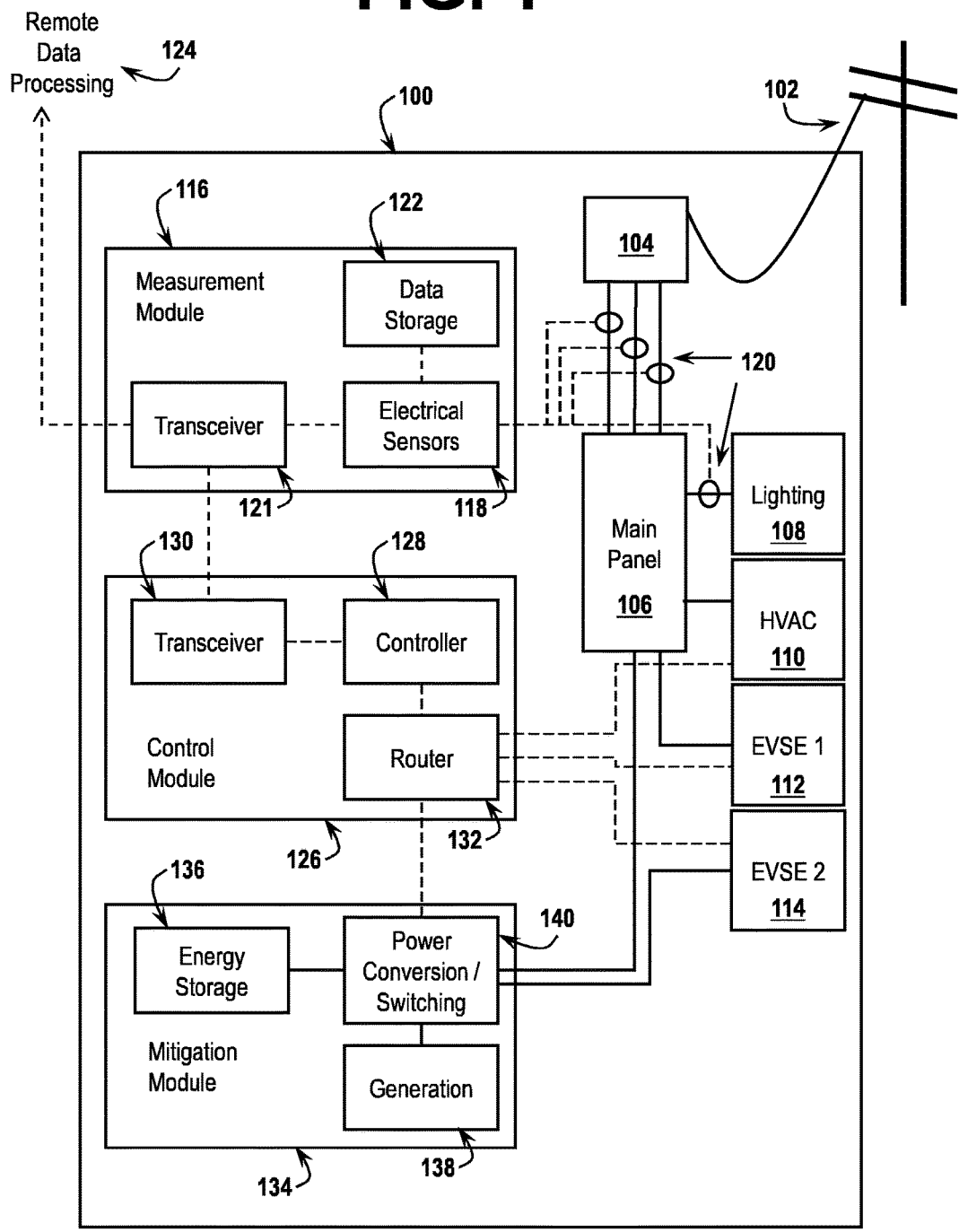
FIG. 1 is a block diagram of a system of modules and electrical systems according to an embodiment of the present invention.

FIG. 1 shows an exemplary embodiment of a system of modules and electrical devices according to the present invention. In this figure, dashed lines between components show connections through which information or control signals are communicated, and the solid lines between components show power bearing lines. Power is provided at a site 100 through a connection to the electrical distribution grid 102 (and, possibly, through a transformer 104 or other converter) to a main service panel 106. From this panel energy is distributed to loads 108, 110, and 112. In some embodiments, some loads, such as load 114, are not connected to the main panel 106 and are separated from the utility distribution grid.

A measurement module 116 is provided at the site 100 having electrical sensors 118. The electrical sensors 118 may include current sensors such as current transformers 120, voltage sensors, consumption sensors, gauges, analog/digital conversion devices, or other similar electricity measuring devices. The measurement module 116 may also include a reporting means, such as a transceiver 121, for transmitting or receiving data from the electrical sensors and other information and/or data storage means 122 for storing data from the electrical sensors and other information. The measurement module 116 may be used to gather consumption data of a load such as the lighting load 108 or the consumption data of a power line between electrical components at the site such as the power lines between the transformer 104 and main panel 106 shown. This module 116 may gather the data and store it using the data storage means 122, such as by encoding the data a hard drive or other computer memory, printing the information on paper, or another similar storage method. The module 116 may also gather the data and transmit it through the reporting means (e.g., transceiver 121) to another module or to a remote data processing point 124. If a remote data processing point 124 is utilized, the transceiver may be a wired or wireless transceiver or modem enabled to send data over an internet protocol system such as Ethernet, the internet, a LAN or WAN, a cellular or wireless digital spectrum, Bluetooth®, Zigbee®, radio transmission or other electromagnetic signal, or through a power line communication (PLC), fiber optic, telephone, or other conduit for transmission of information to the remote processing point. Such wired and wireless means of transmission may also be used to connect the reporting means of the module 116 to other modules at the site 100. In some embodiments, the reporting means may include gauges or other instruments directly readable by a user.

The measurement module 116 monitors the flow of energy in the site for the entire site, certain loads at the site, or both. In some embodiments, sensors such as current transformers 120 are connected to all loads at the site, but in other embodiments, some or none of the loads are monitored by the measurement module 116. Likewise, sensors 120 may measure the total consumption of the site at a point between the transformer 104 and main panel 106 shown, but other measurement points may be used, and in some cases the total consumption of the site is not measured by the measurement module 116 at all. The measurement points indicated by the current transformers 120 of FIG. 1 are to be construed as illustrative and not restrictive as to the nature of the connection between the measurement module 116 and various power lines in the site. Additionally, the measurement module 116 may receive data directly from other points in the site, such as a preinstalled power meter or a through an information-bearing connection to a "smart" load that can report on its energy consumption or other electrical characteristics.

The measurement module 116 may operate its gathering and reporting or storing functions independent of any other modules of various embodiments of the invention at the site. Stored data in the data storage 122 may be accessed or gathered manually by a user, or, in some cases, sent through a transceiver such as transceiver 121 to another module or to another location. In some measurement modules 116 there is no data storage means 122, and in such a case, sensor information is sent simultaneously with its measurement through the transceiver 121. In a preferable embodiment the measurement module 116 is an individual unit that is connectable and disconnectable from other modules or the electrical systems of the site, as desired. For example, the electrical sensors 118, transceiver 121, and data storage 122 may all be integrated into the same enclosure or housing with ports on its surface or with pass-throughs for connection of wires, cables, current transformers, and other connective devices needed to perform the functions of the measurement module 116.

A remote data processing location 124 may be external to the site 100 as shown in FIG. 1, but may also be located at the site itself 100. The remote data processing location 124 is configured to receive signals from the transceiver 121 and to process the information. For example, the remote data processing location 124 may have an antenna transceiver that receives the data coming from the transceiver 121 of the measurement module 116 and stores the data or processes it by detecting patterns in the data. The detection of patterns in the data will be discussed in further detail below.

The site 100 may also have a control module 126 installed. The control module 126 is comprised of a system controller 128, such as a computer, and transceiver 130, and optionally also a router 132 (or other information relaying means) if the loads to which the controller needs to communicate require a router for communication and/or control purposes. A system controller in general refers to a computer or central processing unit (CPU) with corresponding memory, data storage means, data links, input and output ports, and any necessary analog or digital interfaces that are used to receive and analyze data and execute and send instructions and data. Alternatively, the controller may be a circuit embedded with preprogrammed routines for performing the functions of the controller, such as a semiconductor, embedded logic circuit, analog or digital control circuit, or other similar means for performing the functions of the controller that is known in the art. In the event that the controller is a computer or other electronic device or circuit, the processes and patterns that are part of the embodiments of methods disclosed herein may be stored or embodied as executable code in a computer readable medium and configured to cause the controller to configure operational parameters of these methods. The router 132 may be an Ethernet router, dataport, wireless router, or other means for directing signals between the controller and other devices at the site 100 known in the art. In a preferable embodiment the control module 126 is an individual unit that is connectable and disconnectable from the measurement module 116 when desired. For example, the controller 128, transceiver 130 and router 132 may all be integrated into the same enclosure or may be parts of a single computer.

The controller 128 is in communication with the transceiver 130 and the router 132. The controller 128 may also be in communication with the loads themselves if there is no router. By virtue of these connections the controller 128 is capable of receiving consumption data and information via the transceivers 121 and 130, then executing instructions regarding controlling the consumption of the loads to which it is connected. The loads to which it is connected in FIG. 1 are 110, 112, and 114, showing that the control module 126 may be connected to loads that are connected to the electrical grid connection at the site (as evidenced by loads 110 and 112 which are connected to the grid 102 via the main panel 106), or loads that are independent from the grid connection (as evidenced by load 114). If a mitigation module 134 is present, the computer means may also be capable of controlling the charge and/or discharge of the energy storage means 136 or generation means 138 that is part thereof, such as through control of a power conversion or switching apparatus 140 to which the measurement module 126 is connected.

The mitigation module 134 is an additional and separate module from the other modules at the site. The mitigation module 134 contains an energy storage means 136 (such as a battery system, capacitor system, flywheel system, fuel cell system, or other means for storing electrical energy at the site), generation means 138 (such as a gas, diesel, CNG, LNG, or other fuel-based electrical generator, wind generator, photovoltaic (PV) or solar generator, or other means for generating electrical energy at the site), or both, as shown in FIG. 1. The energy storage means 136 and generation means 138 are connected to loads directly (as in the case of load 114) or indirectly (as shown by the connection of the mitigation module 134 to the main panel 106, which then connects to other loads 108, 110, and 112) through power conversion and/or switching means 140. Power conversion may include inverters, power converters, buck or boost converters, and other like power conversion devices. Switching may include electrical switches, transistors, dimming or other variable switches, and other switching devices known in the art. Preferably, the switching elements and conversion devices 140 are controllable by the controller 128.

Measurement and Control of Loads

The measurement module 116 may perform its basic functions independent of the control module 126, but when the two modules are installed or provided at the site together, they are enabled to interact with one another through the transceivers 121 and 130. The measurement module 116 collects consumption data from the site or particular loads and provides that information to the control module 126. The controller 128 is then used to determine how the loads 108, 110, 112, and 114 should be controlled in response to this information. By controlling the loads, the consumption of one or more loads is adjusted. For example, some loads are "smart" loads that monitor their own consumption and can adjust their consumption based on measured conditions or based on instructions provided by the control module 126. For example, some EV service equipment (EVSE) used for charging EVs have the capability to control their output power level based on input data. Some loads may have their consumption adjusted by changing the voltage or current available to the loads, by changing the status of features of the loads, such as turning optional features of the load on or off, by curtailing the load completely, or other similar means for changing the consumption caused by the load. For example, an incandescent lighting load may have its power usage adjusted through a dimming circuit that reduces the voltage available to the lighting, and a fluorescent lighting load may have its power usage adjusted through a dimming circuit that reduces the current available to the lighting. In some embodiments, the site has energy storage devices already in place, such as battery-based universal backup power supply systems, and the control module may be enabled to provide energy to the site by discharging the devices already in place as part of a mitigation and control algorithm for the site.

Because of the existence of widely varied means for controlling different loads, the control means 126 may need to be capable of many different types of consumption management, or relatively few, depending on the circumstances of each site. For example, a control module 126 having electronic communication interfaces for interacting with "smart" loads would not be necessary at a site lacking "smart" loads, but could be indispensable otherwise. Therefore, in a preferable embodiment of the invention, a method of implementing the measurement module 116 and control module 126 is provided to develop and use a utility consumption management system for the site that can efficiently and capably respond to utility consumption management needs of the site with customized control abilities.

Figure 2:
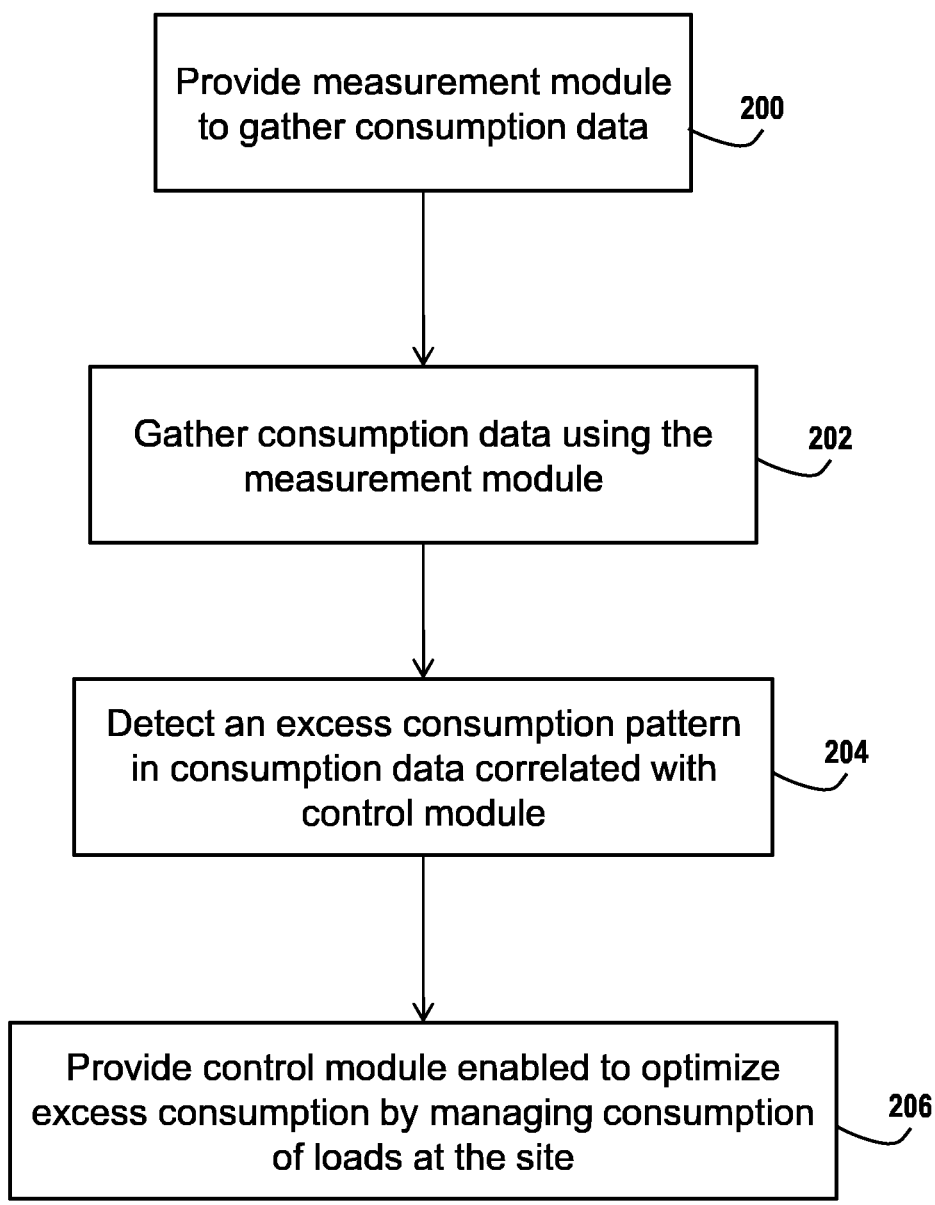
FIG. 2 is a flowchart illustrating an example of a method for implementing a utility consumption management system according to an embodiment of the invention.

FIG. 2 depicts a flowchart showing an example of a method for implementing a utility consumption management system according to an embodiment of the invention. In step 200, a measurement module is provided at the site that is enabled to gather consumption data at the site. This step may include sending or installing the measurement module to the site with electrical sensors of the measurement module that are able to measure consumption data such as current and voltage of various points in the electrical system of the site. It may also consist of sending plans or designs for a measurement module that is enabled to perform the actions described, whether sent in physical, virtual, or electronic format.

Next, the provided measurement module is used to gather consumption data of a load and/or the site over time in step 202. In the case of a provision of the measurement module where a design or plan is sent, the recipient may be the one performing this step of the process. Consumption data gathered in this step may include information regarding the consumption of loads at the site and consumption of the site as a whole, such as current, voltage, or other electrical properties of the loads or site that are indicative or can be used to determine the power usage of the loads or site over time. Transducers, readers, or other instruments may be used as necessary to obtain the data in the gathering step 202. The consumption data may also be considered gathered when it is measured and then stored in a data storage means in the measurement module or when it is reported through a reporting means such as a transceiver to an external detection location such as a remote data processing facility or to an analysis or control module at the site. The time over which data is gathered may be short or long, including but not limited to seconds, minutes, hours, days, weeks, or months, for example.

A principal purpose of gathering the data is to discover trends and patterns that appear in the consumption of the site or particular loads over time. Certain loads have repetitive consumption patterns, such as security systems that consume energy following a consistent pattern every day, so in such a case, the data gathering and observation time may only need to be a matter of days. Other loads, like office computers, for example, follow weekly or monthly patterns, wherein they consume more energy on weekdays than on weekends, or follow yearly patterns, wherein, for example, they consume more energy on non-holiday workdays than on holidays when offices are closed. Some loads follow yearly patterns such as air conditioners that use large quantities of energy in the summer and relatively little energy in the winter. The variation in consumption among different loads may cause the data gathering and observation times for each load, or for the site as a whole, to vary based on the loads at the site and potentially also comparisons to other similar sites and/or loads.

Detected Consumption Pattern Correlation and Customization

Figure 3:
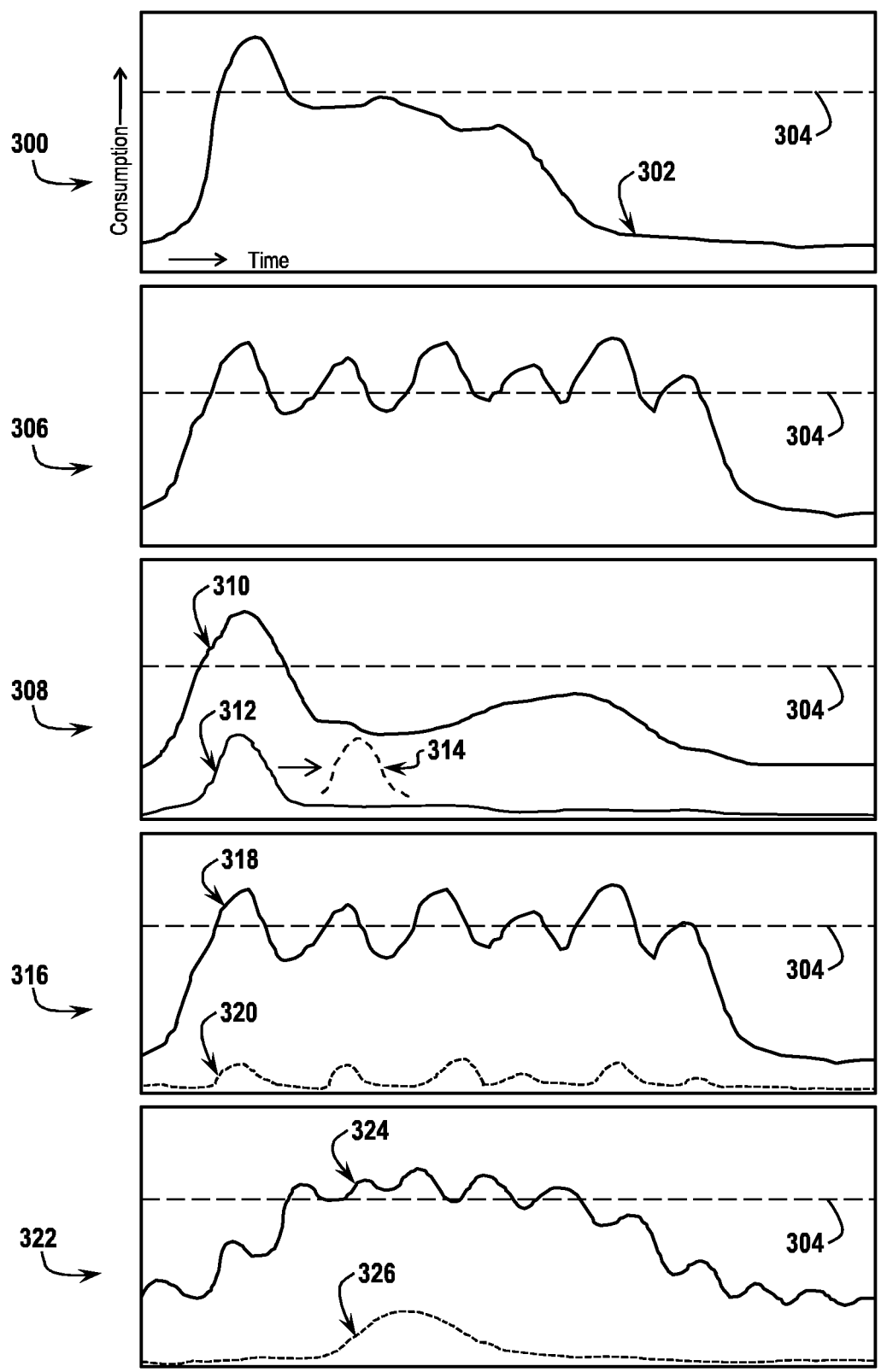
FIG. 3 shows exemplary load profiles illustrating optimizable excess consumption patterns of embodiments of the present invention.

Continuing in reference to FIG. 2, after consumption data is gathered for a length of time at step 202, an excess consumption pattern is detected in the consumption data that is correlated with a control module, as shown in step 204. The detected excess consumption pattern is used to calculate or otherwise determine the abilities, components, and other features of a control module that is correlated with the detected excess consumption pattern in the site or load. For example, if a peak pattern is detected at the same time every day, a control module capable of scheduled curtailment for that time of day may be provided to the site to optimize the load profile to incur less demand during that time. In correlating a control module with an excess consumption pattern, a library or database of excess consumption patterns may be maintained in which patterns are matched with existing modular control devices or in which customization of control modules is explained in correlation with the features of excess consumption patterns. Similarly, excess consumption patterns may be identified as being linked to certain loads, and in this case a correlative control module may be determined to be a module having control capability through an I/O port or other connection means that enables the module to communicate with the load. Thus, a correlative module may be selected from a database or may be a module customized based on features of an excess consumption pattern detected or a device or system of devices that causes the pattern. FIG. 3 illustrates additional examples of excess consumption patterns that can be found in step 204.

In FIG. 3, load profiles of an entire or a device or system of devices that causes the pattern site or individual loads or subsystems of a site are graphed. Chart 300 shows a peak pattern that can be detected as an optimizable excess consumption pattern. The solid line 302 shows a load profile of an entire site that exceeds a consumption threshold level 304 during one peak period. Chart 306 shows an optimizable excess consumption pattern having multiple peaks exceeding the threshold level 304 over a period of time. Chart 308 shows a peak pattern similar to load profile 302, but the load profile of the entire site 310 in chart 308 is accompanied by a load profile of a single load at the site 312 that can be optimized as well. The single load's load profile 312 shows how much that single load contributes to the appearance of the peak in profile 310, which indicates that inducing a delay in the appearance of that load (such as making it follow profile 314 instead of profile 312) could optimize the consumption pattern and keep the overall load profile 310 from exceeding the threshold level 304 for the entire time shown. Chart 316 shows multiple peaks in both the overall load profile of the site 318 and in the load profile of an individual system 320. Chart 322 shows multiple peaks in the overall load profile 324 but not the individual system load profile 326. The load profile patterns shown in FIG. 3 are illustrative examples of members of the group of all possible load profile patterns that can be used when practicing embodiments of the invention, and should not be considered to be limiting on the scope of all consumption profiles or patterns that may be used in practicing embodiments of the invention.

Patterns of excess consumption such as those depicted in the charts of FIG. 3 can potentially be managed by at least four types of control module (or control module plus mitigation module) systems, including: (1) a general curtailment and load shedding control module, (2) a general mitigation module with a control module that can at least control the mitigation module, (3) an individual load shedding control module, and (4) an individual mitigation module with a control module that can at least control the mitigation module. Combinations of these modules and systems may also be implemented, such as a general curtailment and load shedding control module with an individual mitigation module and a general mitigation module. Each of these kinds of modules and some possible circumstances of their implementation will be now described in more detail.

Almost any site can have its consumption managed by general load shedding or curtailment of some sort, and it is relatively inexpensive when compared with mitigation by energy storage or generation, so a general curtailment and load shedding control module may be appropriate at many sites as a match to respond to excess consumption patterns. For example, if a pattern like the peak in load profile 302 is detected, a customized control module may be provided to the site that is a general curtailment and load shedding control module characterized by its ability to connect to and control the consumption of many or all significant loads at the site. A general curtailment and load shedding control module of this type sheds or curtails many loads at the same time to relatively the same extent. In the case of profile 302, this type of customized module is capable of connecting to more than one of the significant loads that lead to the occurrence of the peak in the profile and can turn down the consumption or turn off certain devices in order to avoid allowing peaks to develop in the future. Preferably, this customized control module manages the consumption of these devices without serious interruptions to the normal business of the site, such as merely changing the timing of when HVAC systems and refrigeration units turn on and off without causing a serious disruption in temperature, but in some cases, the site has significant loads that are non-curtailable and non-sheddable, and other modules may perform load management more effectively. Furthermore, because some loads are more expensive to operate when they are curtailed (for example, an HVAC system that must be turned on for a long time after a curtailment event to return the temperature of the air at a site to the preferred level), a general mitigation module, individual control module, or individual mitigation module may be a better means to optimize the appearance of an excess consumption pattern. When an excess consumption pattern is detected, the customized control module may be identified and provided based on these considerations.

Some sites and loads, and therefore some excess consumption patterns, are best optimized using a general mitigation module that is controlled by a control module to discharge energy into the main electrical systems of the site. Such a configuration would be preferably selected when the expense of installing and maintaining the use of energy storage and generation devices outweighs the costs to the site and operator that are realized when a consumption and load shedding module would be used alone. In some embodiments a general mitigation module may be appropriate to provide at the site in order to optimize consumption where the load profile of significant individual loads at the site are not measureable or are unknown (as would be the case in charts 300 and 306).

When customizing or correlating a mitigation module with an excess consumption pattern, the measured and detected pattern is preferably examined in order to determine the capacity and output rate of energy storage or generation devices that will be able to provide optimized capability of mitigating the consumption of the site. For example, the magnitude and duration of a peak in consumption may be determined, and then by finding the amount of energy consumed by the peak that exceeds a demand threshold, the energy storage capacity and power rating required for an energy storage or generation device at the site can be determined for the mitigation module. This determination of the size and capability of the energy storage and generation components is preferably made after any potential load shedding or curtailment during a peak is taken into consideration. Energy storage devices, generator devices, and other equipment in the mitigation module may be selected based on their price (both up-front and over time), their capability to mitigate, environmental or regulatory factors, and other considerations. The mitigation module 134 of FIG. 1 shows a module having energy storage 136 and generation 138, but other mitigation modules could only have one of those energy providing devices as well. For example, a mitigation module may contain only an energy storage device if available generators are unable to provide the rate of discharge (power level) needed for mitigation of an excessive peak consumption pattern or for sites where the peaks are smaller and spaced apart, since an energy storage device typically discharges energy at high power levels and can recharge when peak conditions are not in place. A generator may be preferable in sites where excess consumption patterns are sustained for longer periods of time or when they are infrequent, since generators can typically supply energy for a longer period of time (possibly only limited by availability of their fuel source) and are generally less expensive over time when mitigation is needed infrequently.

An individual mitigation module would operate in a manner similar to a general module in mitigating consumption of a load, but its capabilities and interfaces would be customized and correlated to individual or small numbers of individual loads. For example, if some critical computer loads at the site are not curtailable or able to turn off without severely disrupting business conducted at the site, an individual mitigation module could be provided to mitigate, manage, or divert the consumption of those computer systems in particular and would not discharge energy to the main panel or some other general electrical system in the site. By customizing the components of the mitigation module to connect to an individual load or small number of individual loads or providing a pre-made mitigation module that correlates with the loads, the number of interfaces, converters, and other equipment can be reduced or eliminated, so the size, cost, and complexity of the mitigation module and its effects on the excess consumption pattern can be optimized as much as possible.

By enabling the measurement module to measure and monitor the consumption of an individual load or system of loads, the contribution of those individual loads may produce a customized consumption management system that is designed with those loads in mind. Chart 308 shows an example of how measurement of an individual load may affect the customization and selection of the modules in a consumption management system. An excess consumption pattern is detected as the peak in profile 310, and a single load is measured as having profile 312. Because the peak coincides with a peak in the individual load profile 312, if the individual load is curtailable or delayable, the control module may be customized to interface with that load and have preprogrammed instructions to delay the consumption of that load so that the peak in consumption follows a more optimal profile (such as profile 314 that would not result in a peak that exceeds the threshold level 304). If the individual load is not curtailable, the control module may be customized to interact with a mitigation module having an energy storage means that has its capacity customized to be able to provide power to that individual load during the peak in the individual load profile 312. This would assist in optimizing the excess consumption pattern found in the overall load profile 310 peak. Chart 316 shows another type of excess consumption pattern where the site as a whole is profiled 318 with an individual load profiled 320 as well. If the individual load is mitigated by a mitigation module in this case, the mitigation would likely not be sufficient by itself to bring the peaks in the overall load profile 318 to preferable levels, so that may not be the best solution in customizing a consumption mitigation system for this site's pattern. If the individual load profiled 320 is curtailable, it is likely better for the site to curtail and delay consumption of that load so that the peaks in the individual profile 320 appear between the peaks in the overall load profile 318, especially if an individual curtailment and load shedding control module is expensive than a control module with a general or individual mitigation module added to it for that load. An individual curtailment or load shedding control module would connect directly to the load being curtailed or shed and would have circuitry and instructions needed to control the consumption of that load (or system of similar loads) directly.

In some embodiments, a determination of whether a managed load is curtailable can have an impact on the kind of module or modules that would be best to use when managing consumption. The curtailability of a load may vary from site to site depending on the importance of the load and how the load is used, but in some cases it may be matched to modules within a database that tracks the ability of different loads or kinds of loads to be curtailed and the control modules that are appropriate to curtail those loads.

In some embodiments, an excess consumption pattern and the profiles of individual loads that are monitored at the site may not present a solution for customization of modules that has been seen before at other sites, so it may not be immediately apparent which modules would correlate to the loads. By progressively providing curtailment and load shedding control modules and mitigation modules for different individual loads and for general site consumption management, excess consumption patterns can be brought more and more toward preferable levels as each correlative module is installed at the site. In these embodiments, the modular implementation of the consumption management system allows the site's consumption management to be optimized over time with new or additional correlative modules, even after initial control and mitigation modules have been introduced or provided at the site. Chart 322 shows an example of this, where it may not be immediately clear how to best manage the consumption of the overall load profile 324 and the individual load profile 326 because the peak in the overall profile 324 is much wider and longer than the peak in the individual load profile 326. Therefore, a modularly implemented management system may be provided where an individual load shedding control module for the profiled individual load 326 is first installed, then the measurement module monitors the effects of the individual load shedding control module on the overall load profile 324 and another control or mitigation module is provided to optimally manage the consumption of the new overall load profile that results after load shedding control is implemented. Furthermore, as loads are brought into or taken away from the site, new modules may need to be provided that can interface with new loads, or new modules may need to replace modules that were provided as being customized, specialized, and correlated to loads that have been removed.

In another example, a peak in an overall load profile might be prohibitively large to attempt to mitigate using energy storage and generation alone, and the peak may therefore require curtailment or load shedding capability to bring the excess consumption of the site to a preferred range of consumption levels. In another embodiment, such as could be used in conjunction with the load profile shown in chart 306, a single load profile peak may be small enough to be mitigated by a reasonably-sized mitigation module, but the frequency of the peaks over time may make even a small energy storage module unable to recharge in time to mitigate following peaks without driving up consumption even more, and therefore correlative consumption control and curtailment options would be needed for better optimization of load management over time.

In some embodiments, the excess consumption pattern may comprise consumption information other than peaks or plateaus in consumption. For example, the excess consumption pattern may indicate that the consumption of energy at the site is resulting in electricity costs that exceed a given threshold, so the consumption management modules are programmed and correlated with ability to determine and react to changes in electricity costs.

Providing Correlative Modules

After modules are correlated with an excess consumption pattern in step 204 of FIG. 2, the correlative modules are provided at the site in such a manner that they are enabled to optimize the excess consumption pattern by managing consumption of electricity at the site in step 206. When the correlative modules are provided, this may entail delivery or installation of the modules at the site, delivery or transmission of designs and plans that would enable the site operator to install and use the modules at the site, or other means of provision known in the art. Modules are enabled to optimize an excess consumption pattern when, for example, a control module is programmed with a control management algorithm that correlates to a load or site monitored and measured by the measurement module at the site. In another example, a mitigation module is enabled to optimize an excess consumption pattern when its components are properly selected and configured to be able to mitigate loads or the site as a whole under the direction of a system controller. In some embodiments, ability to optimize an excess consumption pattern is provided when connections are made between the correlative module and the loads causing the excess consumption pattern, such as in a case where a load needs to be rewired to receive energy from a mitigation module or to be controlled by a control module, or in a case where cords, plugs, and other electrical connective devices need to be installed to make control and mitigation possible.

Optimizing of an excess consumption pattern may comprise consumption optimization in reducing a peak, plateau, or other pattern of consumption that is in excess of a consumption threshold, such as a demand charge-inducing threshold. The optimization would keep a load profile from exceeding the threshold or would keep it from exceeding the threshold as much as it did before the optimization. It could also change the nature of a load profile, such as reducing the magnitude of periodic peaks that would not necessarily exceed a consumption threshold but could bring the consumption of the site close to a maximum consumption rating or service limit for electrical systems and connections in the site.

In some embodiments, electricity is charged at variable rates depending on time of day, year, location, or other factors. Here, optimization may comprise cost optimization, where the modules act to prevent loads from exceeding a price or cost threshold that would appear if the consumption of the loads were not controlled and/or mitigated. The measurement module or control module in these embodiments may be enabled to determine current pricing or cost ranges in effect at a given time and then to make control and mitigation decisions based on that information.

Demand Response Program Correlation

Some utility providers operate demand response programs, where certain customers qualify for discounts or rebates on their electricity bills for reducing their demand when requested by the utility provider. There are myriad different ways that a site could be considered to qualify for participation in these programs between the customer's geographic location, location in the hierarchy of the utility's distribution network, the customer's consumption rates, peak consumption times, and more, but if the criteria contain conditions that can be monitored and measured by a measurement module of the systems described herein, an embodiment of some methods of the invention may comprise steps of providing a measurement module to the site correlative to the demand response program by being enabled to gather relevant demand response program participation data, gathering the relevant consumption data, detecting qualification for a demand response program in the relevant consumption data, and providing a customized control module enabled to reduce consumption at the site by an amount required in a demand response program when triggered by a user or by receiving instructions from the utility provider via a wired or wireless transceiver. In another embodiment, an energy storage or generation module may be provided in addition to a control module. In this case, the energy storage or generation module may be customized to be able to provide power for a load or system of loads at the site at a power level and for a period of time sufficient to satisfy demand response requirements set by the utility provider.

Alternative Module Composition

Figure 4:
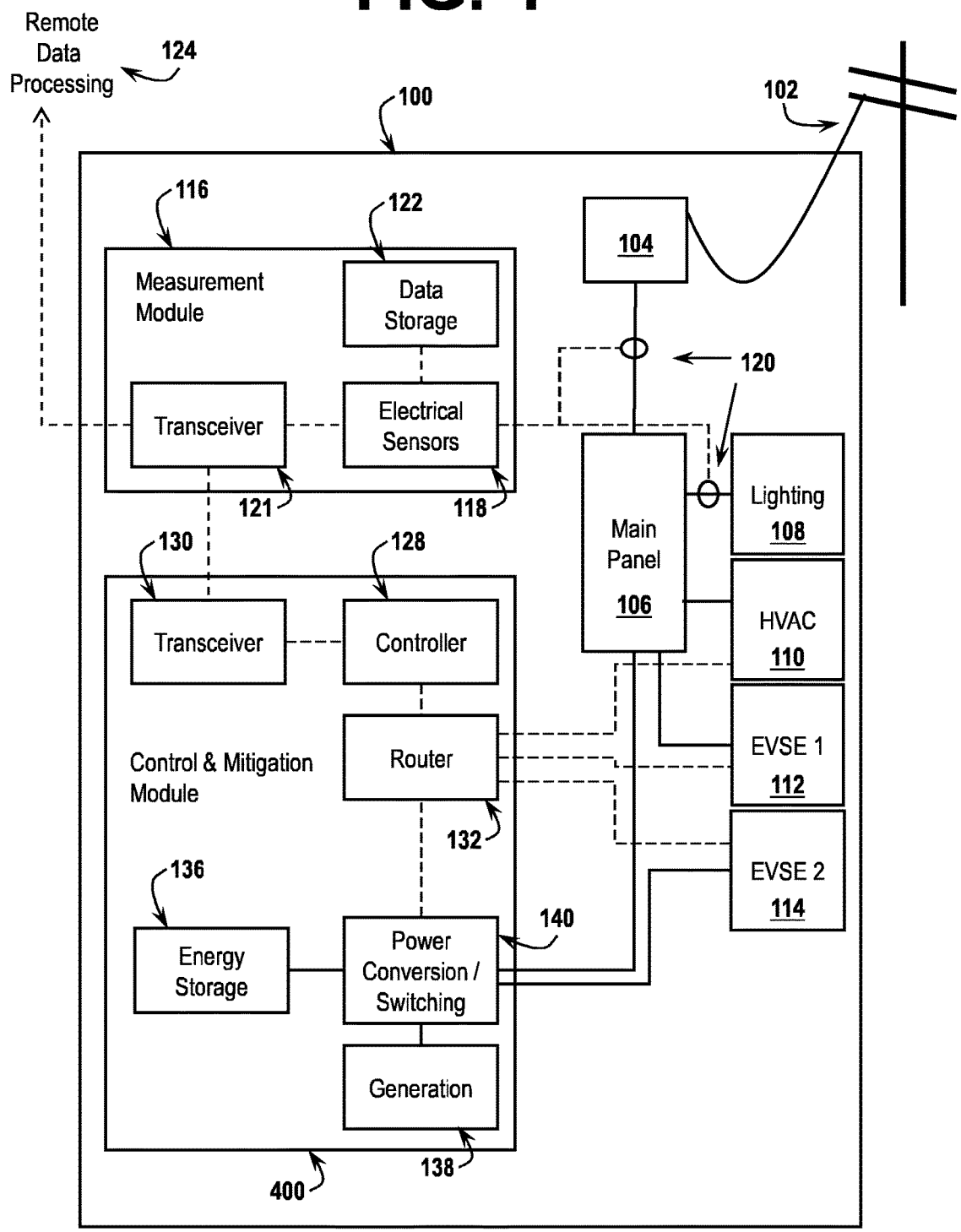
FIG. 4 is a block diagram of a system of modules and electrical systems according to an embodiment of the present invention having a combined module.

FIG. 4 illustrates a modular system for consumption management at a site that is comparable to the system of FIG. 1, with a measurement module 116, panel 106, and loads 108, 110, 110, 112, and 114, but in this embodiment, the control and mitigation modules are combined into a control and mitigation module 400. The controller 128, transceiver 130, router 132, energy storage system 136, power conversion and switching apparatus 140, and generation device 138 are all provided simultaneously to the site as part of a single module 400. In some situations, an excess consumption pattern may be detected that correlates with a mitigation module and a control module, and instead of supplying them separately, the two modules are provided together. This combination may make the management system more compact by reducing extra enclosure requirements, more tamper-proof by reducing the number of connections exposed to the site operator, faster to implement by reducing the number of pieces that need to be provided and by decreasing the measurement time needed before a mitigation module is put in place, and may be less expensive due to these factors. It may also be advantageous if the router 132 does not have sufficient connections to link the controller 128 to the power conversion or switching apparatus 140, since the controller may be directly connected to the apparatus 140 more conveniently when they are within the same housing. The current transformers 120 in this figure are also configured differently than those seen in FIG. 1, illustrating that three-phase connection between a transformer 104 and main panel 106 is not required, and that single-phase connection, or a single phase of a three-phase connection, can be measured alone in some embodiments.

Figure 5:
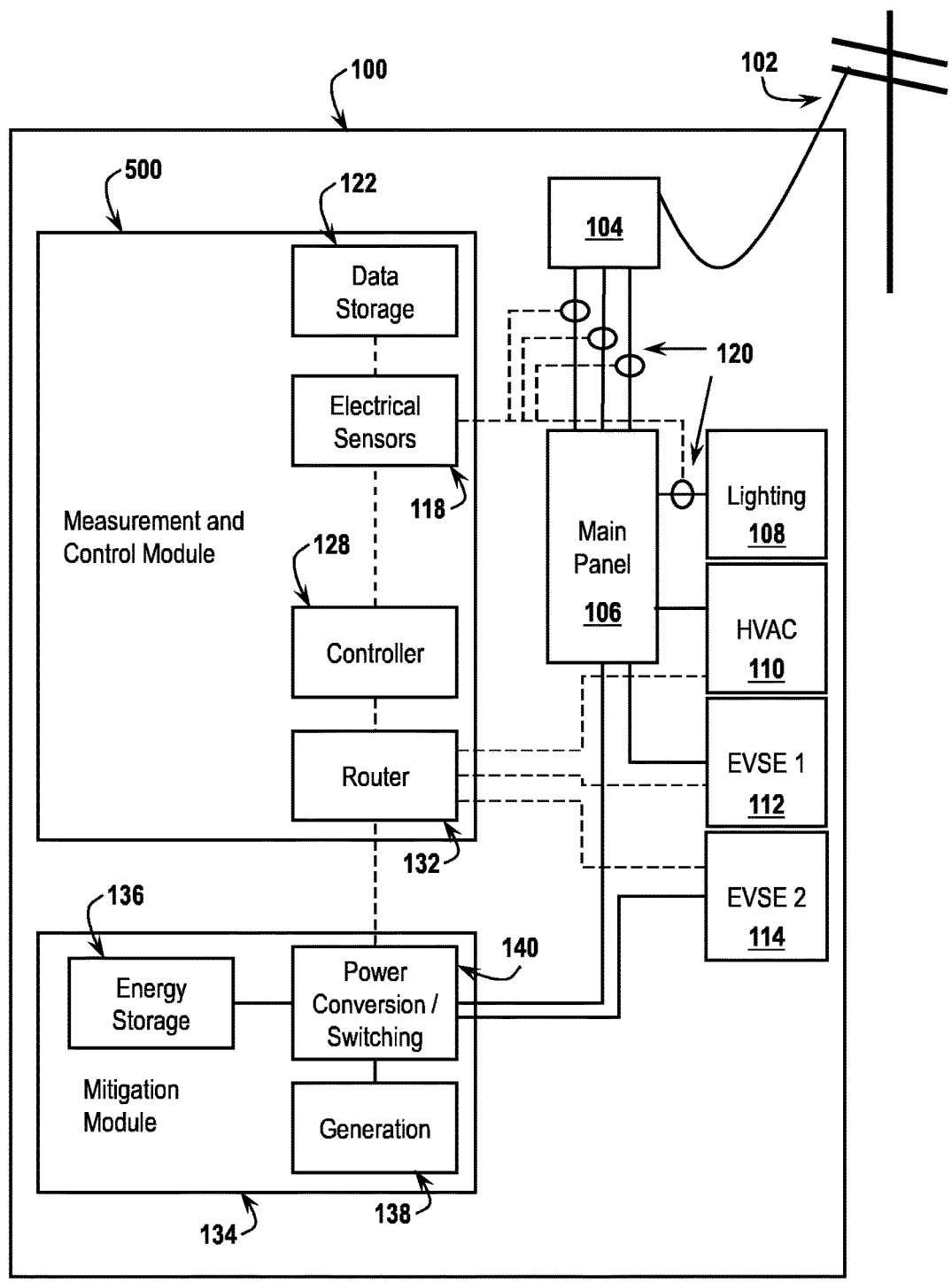
FIG. 5 is a block diagram of a system of modules and electrical according to another embodiment of the present invention having a combined module.

FIG. 5 shows another modular system wherein functions of previously-described modules are combined. A measurement and control module 500 takes the place of a measurement module and control module in measuring and gathering consumption data and may provide a more direct connection between the sensors 118 and the controller 128, such as in installations where high sensitivity is required. Other elements such as a transceiver are omitted from this illustrative embodiment. The combined measurement and control module 500 is connectable to a mitigation module 134 and the loads 108, 110, 112, and 114 in the same manner as the embodiment of FIG. 1.

MISCELLANEOUS DEFINITIONS AND EMBODIMENT SCOPE INFORMATION

Generally speaking, as used herein a "power converter" may refer to a generic electric power converter, inverter, transformer, regulator, voltage stabilizer, rectifier, power supply unit, or other conversion device or combination of these devices that may be used to convert the voltage, frequency, and/or phase of an electrical power source or signal from one form into another form.

As used herein, an "energy storage device" ("ESD") is a means for storing energy such as, for example, electrochemical batteries, compressed gas storage, pumped hydro storage, flywheel energy storage, capacitive energy storage, superconductive magnetic energy storage, fuel cell energy storage, combinations thereof, and other similar devices for energy storage known in the art. If the energy storage device includes a battery, the battery types may include rechargeable or non-rechargeable chemistries and compositions, such as, for example, lead-acid, alkaline, secondary lead acid, lithium-ion, sodium (zebra), nickel-metal hydride, nickel cadmium, combinations thereof, and other energy storage chemistries known in the art. Energy storage devices may be comprised of small or large numbers of cells, capacities, voltages, amperages, and other battery properties. They may be configured in unitary or modular designs and may follow standardized guidelines or customized specifications.

The term "computer-readable medium" as used herein includes not only a single physical medium or single type of medium, but also a combination of one or more physical media and/or types of media. Examples of a computer-readable medium include, but are not limited to, one or more memory chips, hard drives, optical discs (such as CDs or DVDs), magnetic discs, and magnetic tape drives. A computer-readable medium may be considered part of a larger device or it may be itself removable from the device. For example, a commonly-used computer-readable medium is a universal serial bus (USB) memory stick that interfaces with a USB port of a device. A computer-readable medium may store computer-readable instructions (e.g. software) and/or computer-readable data (i.e., information that may or may not be executable). In the present example, a computer-readable medium (such as memory) may be included to store instructions for the controller to operate the heating of the ESD and historical or forecasted temperature data for the ESD or its surroundings.

In some embodiments the energy storage devices may be integrated with or connected to power management systems, such as those used for peak mitigation, load leveling, or backup or uninterruptible power supplies, since they may conveniently provide the electronic equipment needed to connect an energy storage device to the distribution grid. However, energy storage devices that serve other purposes may be utilized when the necessary connecting equipment is used. Such connecting equipment may comprise power converters for changing voltage signals, inverters for changing AC signals to DC signals (or vice versa), controllers for directing the operation of the power converters, signal conditioning electronics such as stabilizing capacitors, cables, connectors, and other items required to efficiently and safely bring the stored energy to the distribution grid.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard,"

"known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or component of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A method for modular implementation of a utility consumption management system for a site, the method comprising:
providing a modular measurement device at the site, the modular measurement device being enabled to gather consumption data at the site by attachment of the modular measurement device to an electrical system at the site;
gathering consumption data of the electrical system over time using the modular measurement device;
detecting an excess consumption pattern in the consumption data that is optimizable with a modular control device, the modular control device being a separate device from the modular measurement device, the modular control device being customized to reduce the excess consumption pattern;
providing the modular control device at the site in response to gathering the consumption data over time using the modular measurement device, the modular control device being connected to the electrical system in addition to the modular measurement device, wherein the modular control device is enabled to optimize the excess consumption pattern by managing consumption of electricity at the site;
detecting an excess consumption pattern in the consumption data that is optimizable with a modular mitigation device, the modular mitigation device comprising an energy storage system charged from a utility grid, the energy storage system having a storage capacity, the storage capacity corresponding to the detected excess consumption pattern, the modular mitigation device being correlated with the excess consumption pattern;
delivering or installing the modular mitigation device at the site, the modular mitigation device being enabled to optimize the excess consumption pattern by providing energy at the site, the modular mitigation device being delivered or installed in response to detecting the excess consumption pattern that is optimizable with the modular mitigation device, the modular mitigation device being controllable by the modular control device.

2. The method of claim 1, wherein said modular mitigation device is enabled to provide energy at the site to a load separated from the utility distribution grid.

3. The method of claim 1, wherein said modular control device and said modular mitigation device are provided as parts of one device.

4. The method of claim 1, wherein said excess consumption pattern is optimized in such a manner as to allow the site to accommodate an additional load without exceeding a threshold consumption value.

5. The method of claim 4, wherein the threshold consumption value is a peak demand charge-inducing consumption value.

6. The method of claim 1, wherein said excess consumption pattern is optimized in such a manner as to allow the site to operate an additional load without exceeding a threshold consumption value.

7. The method of claim 6, wherein the threshold consumption value is a maximum consumption rating of an electrical system of the site.

8. The method of claim 6, wherein the threshold consumption value is a peak demand charge-inducing consumption value.

9. The method of claim 1, wherein said gathering consumption data over time using the modular measurement device comprises gathering consumption data of the site as a whole and gathering consumption data of at least one individual load at the site, and wherein consumption of the at least one individual load is managed by said modular control device.

10. The method of claim 9, wherein said at least one individual load causes said excess consumption pattern.

11. The method of claim 1, wherein the modular control device is enabled to provide energy to the site by discharging the energy storage system of the site.

12. The method of claim 1, wherein the excess consumption pattern is a peak or plateau in consumption.

13. The method of claim 1, wherein the modular mitigation device is a separate device from the modular control device.

14. A method for modular implementation of a utility consumption management system for a site, the method comprising:
- providing a modular measurement-control device at the site, the modular measurement-control device being enabled to gather consumption data at the site and to manage consumption of electricity at the site;
- gathering consumption data of a plurality of loads at the site over time using the modular measurement-control device;
- detecting an excess consumption pattern in the consumption data of a single load of the plurality of loads that is optimizable with a modular mitigation device, the modular mitigation device being a separate device from the modular measurement-control device, the modular mitigation device being correlated with the excess consumption pattern by comprising components configured to provide an energy storage capacity or an output rate required to mitigate the excess consumption pattern, the modular mitigation device comprising an energy storage system charged from a utility grid, the energy storage system having a storage capacity, the storage capacity corresponding to the detected excess consumption pattern; and
- delivering or installing the modular mitigation device at the site in response to detecting the excess consumption pattern using the modular measurement-control device, wherein the modular mitigation device is enabled to optimize the excess consumption pattern by providing energy at the site, the modular mitigation device being controllable by the modular measurement-control device.

15. The method of claim 14, wherein said excess consumption pattern is optimized in such a manner as to allow the site to operate an additional load without exceeding a threshold consumption value.

16. The method of claim 15, wherein the threshold consumption value is an electrical utility service limit of the site.

17. The method of claim 15, wherein the threshold consumption value is a peak demand charge-inducing consumption value.

18. The method of claim 14, wherein said gathering consumption data over time using the modular measurement-control device comprises gathering consumption data of the site as a whole and gathering consumption data of at least one individual load at the site, and wherein consumption of the at least one individual load is mitigated by said modular mitigation device.

19. The method of claim 18, wherein said at least one individual load causes said excess consumption pattern.

* * * * *